US010778355B1

(12) United States Patent
Rincon et al.

(10) Patent No.: US 10,778,355 B1
(45) Date of Patent: Sep. 15, 2020

(54) FREQUENCY DIVISION MULTIPLEXING SCHEME FOR PHASING SYNTHETIC APERTURE RADARS AND RECEIVERS

(71) Applicant: United States of America as represented by the Administrator of NASA, Washington, DC (US)

(72) Inventors: Rafael Rincon, Greenbelt, MD (US); Dee-Pong Daniel Lu, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 16/432,357

(22) Filed: Jun. 5, 2019

(51) Int. Cl.
*H04L 27/00* (2006.01)
*H04J 1/08* (2006.01)
*G01S 7/03* (2006.01)
*G01S 13/02* (2006.01)
*G01S 13/90* (2006.01)

(52) U.S. Cl.
CPC ............... *H04J 1/08* (2013.01); *G01S 7/034* (2013.01); *G01S 13/90* (2013.01); *G01S 2013/0245* (2013.01)

(58) Field of Classification Search
CPC .... H04J 1/08; G01S 7/034; G01S 2013/0245; G01S 13/90
USPC ......................................................... 370/343
See application file for complete search history.

(56) References Cited

U.S. PATENT DOCUMENTS

| 6,782,038 | B1* | 8/2004 | Khlat | H03C 3/40 375/147 |
| 8,457,026 | B1* | 6/2013 | Ho | H04B 7/0617 342/359 |
| 9,565,043 | B1* | 2/2017 | Li Puma | H04B 1/04 |
| 2006/0293011 | A1* | 12/2006 | Park | H03F 3/24 455/260 |
| 2009/0161793 | A1* | 6/2009 | Nentwig | H04L 27/366 375/297 |
| 2009/0310711 | A1* | 12/2009 | Chiu | H04L 27/364 375/302 |
| 2010/0067602 | A1* | 3/2010 | Noel | H04B 7/0842 375/267 |
| 2013/0336422 | A1* | 12/2013 | Sombrin | H03F 1/3288 375/297 |

* cited by examiner

*Primary Examiner* — Faisal Choudhury
(74) *Attorney, Agent, or Firm* — Christopher O. Edwards; Bryan A. Geurts; Helen M. Galus (57) ABSTRACT

A frequency division multiplexing system includes a processor, a first digital to analog converter (DAC) for generating a local oscillator signal, a second DAC for generating a chirp signal, and a plurality of electronic elements, each having a transmit signal mixer for combining the local oscillator and chirp signals, and a transceiver configured to transmit the combined local oscillator and chirp signals, where the processor may be configured to operate the first DAC and second DAC to vary frequencies of the local oscillator and chirp signals such that the combination of the local oscillator and chirp signals results in a constant center frequency with a varying phase.

18 Claims, 5 Drawing Sheets

FREQUENCY DIVISION MULTIPLEXING SCHEME FOR PHASING SYNTHETIC APERTURE RADARS AND RECEIVERS

ORIGIN OF THE INVENTION

Invention by Government Employee(s) Only

The invention described herein was made by an employee of the United States Government, and may be manufactured and used by or for the Government for governmental purposes without the payment of any royalties thereon or therefor.

BACKGROUND

Field

The aspects of the present disclosure relate generally to radar systems and in particular to frequency division multiplexed phased array synthetic aperture radar systems.

Description of Related Art

Typical synthetic aperture radar systems have a side-looking imaging geometry and are based on a pulsed radar installed on a moving platform. Similar to conventional radar, the radar system sequentially transmits high power electromagnetic pulses and receives sequential echoes of the resulting backscattered signal. In addition, a synthetic aperture radar platform utilizes the motion of the platform to synthesize an antenna in the flight direction that is significantly larger than a physical antenna. As the radar system travels, the antenna footprint traverses the surface below and the radar system sequentially transmits pulses and receives the sequential echoes of the backscattered signal. Thus, every point in the radar "swath" is imaged many times by the moving radar platform under constantly changing yet predictable observation geometries.

Figure 1:
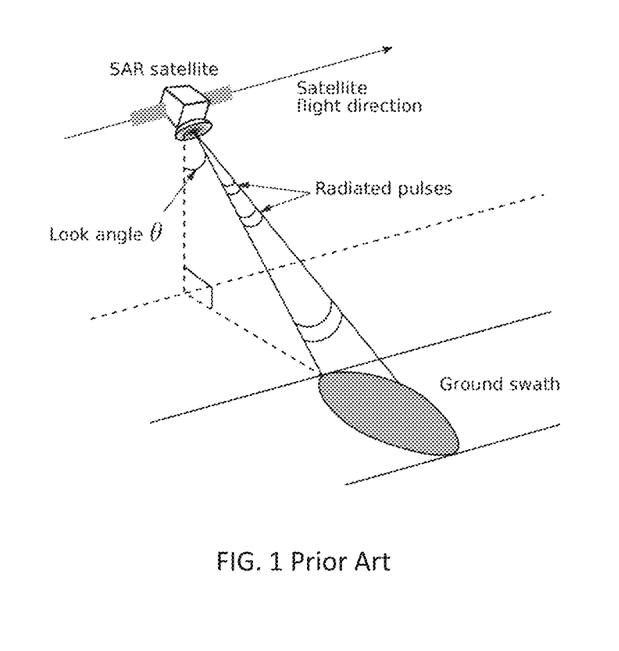
FIG. 1 shows a diagram of a prior art synthetic aperture radar implementation.

In synthetic aperture radar systems, this change in observation geometry, resulting in a constant change of the distance from the radar to the point on the ground, is precisely encoded in the phase of the observed radar response. The "phase history" for any point on the ground located at a constant distance parallel to the flight track is the same. By compensating the phase history of each pulse that is affecting a particular point on the ground, it is possible to focus the energy across the synthetic aperture and create an image that is significantly improved over optical or conventional radar techniques. After a two-way trip of a transmitted pulse from the moving platform to the ground and back, objects may be distinguished if they are spatially separated by more than half the pulse width. Hence, range resolution is controlled by the transmitted waveform where wider bandwidth signals generate finer resolution images. FIG. 1 shows a diagram of an exemplary synthetic aperture radar implementation.

However, traditional phased array synthetic aperture radars typically require a large array of redundant elements arranged in a parallel architecture that includes large arrays of independent sets of components, including processors, signal generating, and phase shifting components for each channel used to steer the beam in a particular direction. Such systems incur large mass, power, component number, and cost penalties. While they may provide full configurability, present systems provide a bandwidth that may be far beyond what is required for a particular mission, may require hardware intensive synchronization and data storage schemes, and may have space and power requirements that are prohibitive, in particular for planetary missions.

Accordingly, it would be desirable to provide a phased array synthetic aperture radar system that addresses problems with prior art implementations and utilizes architectures and processing techniques that result in lower size, weight, and power consumption, a reduction of redundant hardware, as well as more efficient utilization of hardware.

SUMMARY

As described herein, the exemplary embodiments overcome one or more of the above or other disadvantages known in the art.

In one aspect of the disclosed embodiments, a frequency division multiplexing system includes a processor, a first digital to analog converter (DAC) for generating a local oscillator signal, a second DAC for generating a chirp signal, and a plurality of electronic elements, each having a transmit signal mixer for combining the local oscillator and chirp signals, and a transceiver configured to transmit the combined local oscillator and chirp signals, where the processor may be configured to operate the first DAC and second DAC to vary frequencies of the local oscillator and chirp signals such that the combination of the local oscillator and chirp signals results in a constant center frequency with a varying phase.

The processor may be configured to operate the second DAC to provide a signal for chirping the combination of the local oscillator and chirp signals.

The transceiver may be configured to receive the combined local oscillator and chirp signals after transmission and backscattering, where each electronic element may further include a receive signal mixer configured to down convert the received combined local oscillator and chirp signals using the local oscillator signal, and an analog to digital converter (ADC) for generating a digital representation of the down converted signal for analysis by the processor.

The frequency division multiplexing system may include a power splitter configured to connect the plurality of electronic elements to the first DAC, the second DAC, and the ADC in parallel.

The plurality of electronic elements may be connected in a daisy chain.

In another aspect of the disclosed embodiments, a method of frequency division multiplexing includes using a processor and a first digital to analog converter (DAC) to generate a local oscillator signal, using the processor and a second DAC to generate a chirp signal, using a plurality of electronic elements to combine the local oscillator and chirp signals and transmit the combined local oscillator and chirp signals, and using the processor to operate the first DAC and second DAC to vary frequencies of the local oscillator and chirp signals such that the combination of the local oscillator and chirp signals results in a constant center frequency with a varying phase.

The method of frequency division multiplexing may include using the processor to operate the second DAC to provide a signal for chirping the combination of the local oscillator and chirp signals.

The method of frequency division multiplexing may also include receiving the combined local oscillator and chirp signals after transmission and backscattering, and using each electronic element to down convert the received combined local oscillator and chirp signals using the local oscillator signal, and generate a digital representation of the down converted signal for analysis by the processor.

The method of frequency division multiplexing may include connecting the plurality of electronic elements in parallel through a power splitter.

The method of frequency division multiplexing may also include connecting the plurality of electronic elements in a daisy chain.

In yet another aspect of the disclosed embodiments, a frequency division multiplexing system includes a processor, a first digital to analog converter (DAC) for generating a first local oscillator signal, a second DAC for generating a second local oscillator signal, and a plurality of electronic elements, each having a local oscillator generating mixer for combining the first and second local oscillator signals, where the processor is configured to operate the first DAC and second DAC to vary frequencies of the first and second local oscillator signals such that the combination of the first and second local oscillator signals results in a constant center frequency with a varying phase, a third DAC for generating a chirp signal to be combined with the combination of the first and second local oscillator signals for pulse compression, and a transceiver configured to transmit the combined local oscillator and chirp signals.

The transceiver may be configured to receive the combined local oscillator and chirp signals after transmission and backscattering and each electronic element may further include a de-chirping mixer configured to de-chirp the received combined local oscillator and chirp signals using a global de-chirping signal, a receive signal mixer configured to down convert the de-chirped combined local oscillator signals using the combined local oscillator signal; and an analog to digital converter (ADC) for generating a digital representation of the down converted signal for analysis by the processor.

The frequency division multiplexing system may include a power splitter configured to connect the plurality of electronic elements to the first DAC, the second DAC, the third DAC, and the ADC in parallel.

The plurality of electronic elements may be connected in a daisy chain.

In still another aspect of the disclosed embodiments, a method of frequency division multiplexing includes using a processor and a first digital to analog converter (DAC) for generating a first local oscillator signal, using the processor and a second DAC for generating a second local oscillator signal, use a plurality of electronic elements to combine the first and second local oscillator signals, use the processor to operate the first DAC and second DAC to vary frequencies of the first and second local oscillator signals such that the combination of the first and second local oscillator signals results in a constant center frequency with a varying phase, and use the processor to operate a third DAC to generate a chirp signal to be combined with the combination of the first and second local oscillator signals for pulse compression and transmission.

The method of frequency division multiplexing may include receiving the combined local oscillator and chirp signals after transmission and backscattering, and using each electronic element to de-chirp the received combined local oscillator and chirp signals using a global de-chirping signal, down convert the de-chirped combined local oscillator signals using the combined local oscillator signal, and generate a digital representation of the down converted signal for analysis by the processor.

The method of frequency division multiplexing may include connecting the plurality of electronic elements in parallel through a power splitter.

The method of frequency division multiplexing may also include connecting the plurality of electronic elements in a daisy chain.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DETAILED DESCRIPTION OF THE DISCLOSED EMBODIMENTS

The disclosed embodiments facilitate hardware resource sharing by using the available bandwidth of centralized data converters to reduce complexity. Local oscillator and chirp signals used for beam steering and for pulse compression may be generated digitally by a processor and a series of DACs, thus providing a programmable, reconfigurable, synthetic aperture radar system that provides digital phasing for multiple frequency bands, without the need for multiple radar channels with a large number of analog components.

Figure 2:
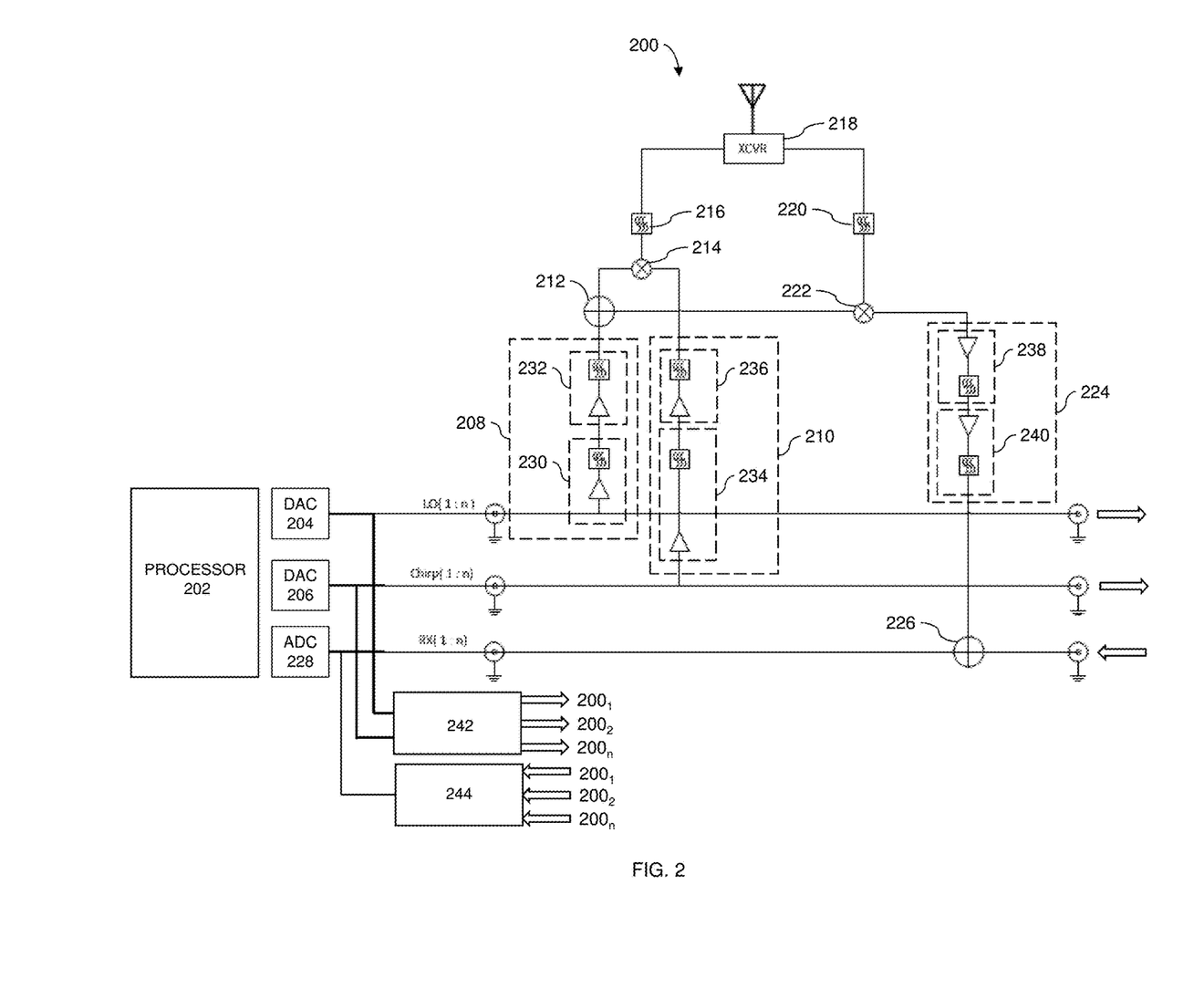
FIG. 2 shows an exemplary implementation of a synthetic aperture radar system according to the disclosed embodiments.

FIG. 2 shows an exemplary embodiment of an electronic element 200 that may be used as part of an implementation of a synthetic aperture radar system. While a single electronic element 200 is shown and described, it should be understood that the disclosed embodiments may utilize any number of electronic elements and typical embodiments may include a number of electronic elements chained together.

The electronic assembly 200 may include a processor 202, a DAC 204 for generating a local oscillator frequency signal LO(1:n) and a DAC 206 for generating a chirp frequency signal chirp(1:n). The electronic assembly 200 may include an LO signal amplifier and filter section 208, a chirp frequency signal amplifier and filter section 210, a local oscillator splitter 212, a transmit signal mixer 214, a transmit signal filter 216, and a transceiver 218. The electronic assembly 200 may further include a receive signal filter 220, a receive signal mixer 222, a converted receive signal filter and amplifier section 224, a converted receive signal combiner 226, and an ADC 228.

The LO signal amplifier and filter section 208 may include a first stage 230 and a second stage 232, each having a narrowband surface wave acoustical filter. The chirp frequency signal amplifier and filter section 210 may also include a first stage 234 and a second stage 236, each having an IF filter. The converted receive signal filter and amplifier section 224 may further have 2 IF filter stages 238, 240

In operation, the processor 202 may feed signals to DAC 204 for generating a local oscillator frequency signal LO(1:n). The LO signal amplifier and filter section 208 may operate to amplify the LO(1:n) signal and filter the LO(1:n) signal to attenuate harmonics, and limit the LO(1:n) signal to a specific frequency signal LO(n) which may be coupled to the transmit mixer 212.

The processor 202 may also feed signals to DAC 206 for generating a chirp frequency signal chirp(1:n). The chirp frequency signal chirp(1:n) may be used for beam steering as well as for chirping for signal compression. The chirp(1:n) signal amplifier and filter section 208 may operate to amplify the LO(1:n) signal and filter the chirp(1:n) signal to attenuate harmonics and limit the chirp(1:n) signal to a specific frequency signal chirp(n) which may be coupled to the transmit mixer 214. The transmit signal mixer 214 may operate to combine the specific frequency signals LO(n) and chirp(n) which may then be filtered to a bandwidth around a center frequency by the transmit signal filter 216, and may be coupled to the transceiver 218 for transmission by an element of a multi-element antenna. In this embodiment, the chirp(n) signal may be used to provide a phase difference to steer the transmitted beam as well as provide a chirp signal for pulse compression.

The transceiver 218 may also operate to receive the backscattered transmitted signal which may then be filtered to a bandwidth around the center frequency by the receive signal filter 220, and may then be converted by the receive signal mixer 222, may be further filtered and amplified by the converted receive signal filter and amplifier section 224, and mixed with received signals from other electronic elements, if any, using the converted receive signal combiner 226. The mixed received signals may be converted to a digital signal by the ADC 228 and provided to the processor 202.

The processor 202 may operate to feed signals to the DAC 204 and the DAC 206 such that the specific frequency signals LO(n) and chirp(n), when combined by the transmit mixer 212, produce the center frequency with a weighted phase and amplitude for steering a beam produced by the transceiver 218. For example, for a center frequency of 435 MHz, the processor 202 may operate to feed signals to the DAC 204 and the DAC 206 such that each electronic element produces exemplary LO(n) and chirp(n) signals that when mixed, result in a 435 MHz signal with a specific phase and amplitude. In a further example with 3 electronic elements, the processor 202 may operate to feed signals to the DAC 204 and the DAC 206 such that each electronic element produces exemplary LO(n) and chirp(n) signals of 127 MHz and 308 MHz, 254 MHz and 181 MHz, and 381 MHZ and 54 MHz, respectively, with each combination providing different transmission signal phase angles and amplitudes.

While some embodiments may utilize a daisy chain of electronic elements 200, it should be understood that in alternate embodiments, the electronic elements 200 may be connected in parallel to DACs 204, 206 and ADC 228 using power splitters 242, 244 that may provide individual signal paths between the DACs 204, 206 and ADC 228 and each of the electronic elements $200_1 \ldots 200_n$.

Figure 3:
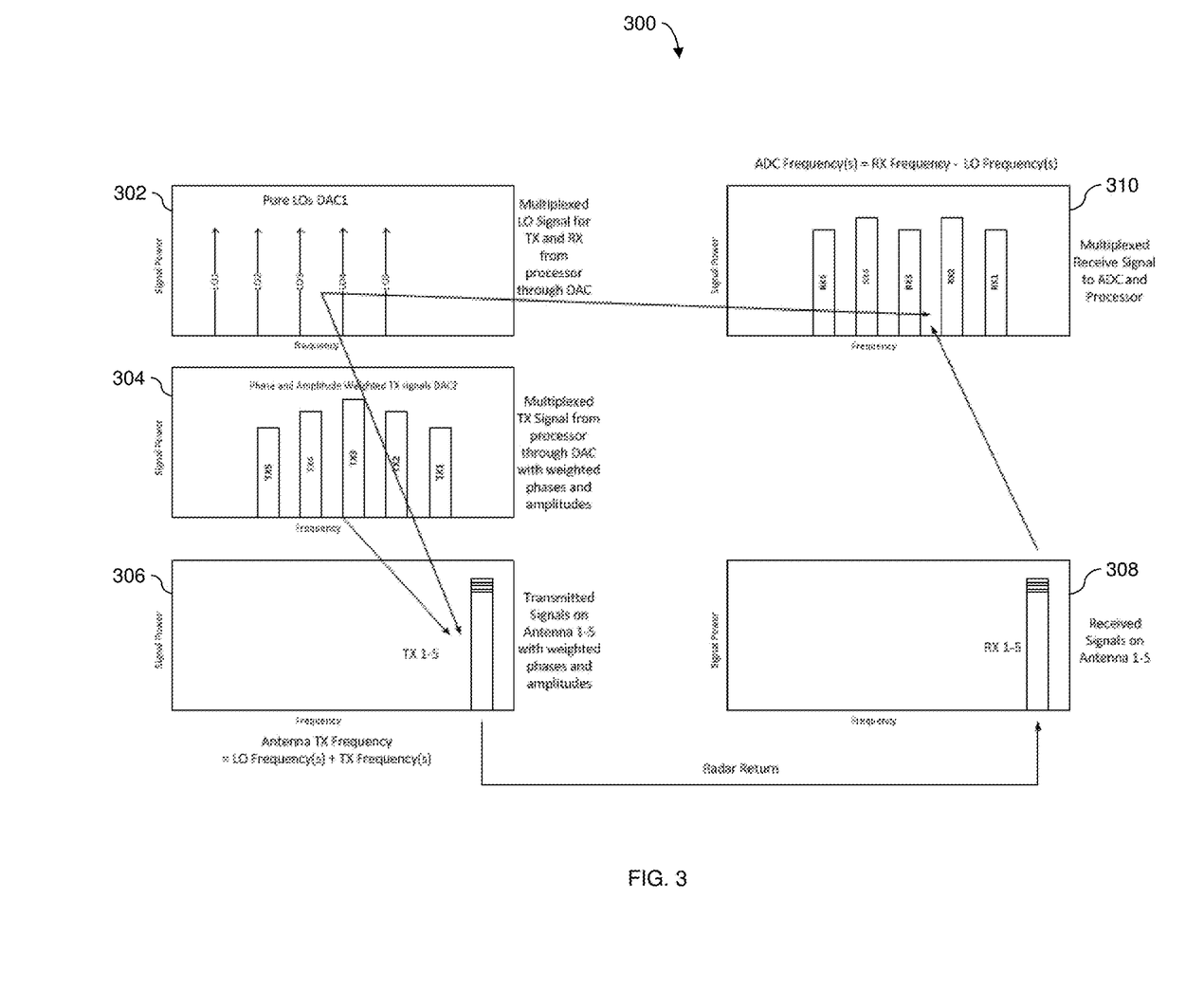
FIG. 3 illustrates an exemplary frequency plan for the embodiment of FIG. 2.

An exemplary simplified frequency plan 300 for an exemplary implementation of the embodiment of FIG. 2, utilizing 5 channels, is illustrated in FIG. 3. The local oscillator signals LO from DAC 204, shown in block 302, may be mixed with the chirp signals having weighted phases and amplitudes from DAC 206, shown in block 304, and may be transmitted by the respective transceivers 218, as shown in block 306. As shown in block 308, the backscattered signals may be received, and as shown in block 310, may be mixed with the LO signals and may be converted by the ADC 228 for processing by the processor 202.

Figure 4:
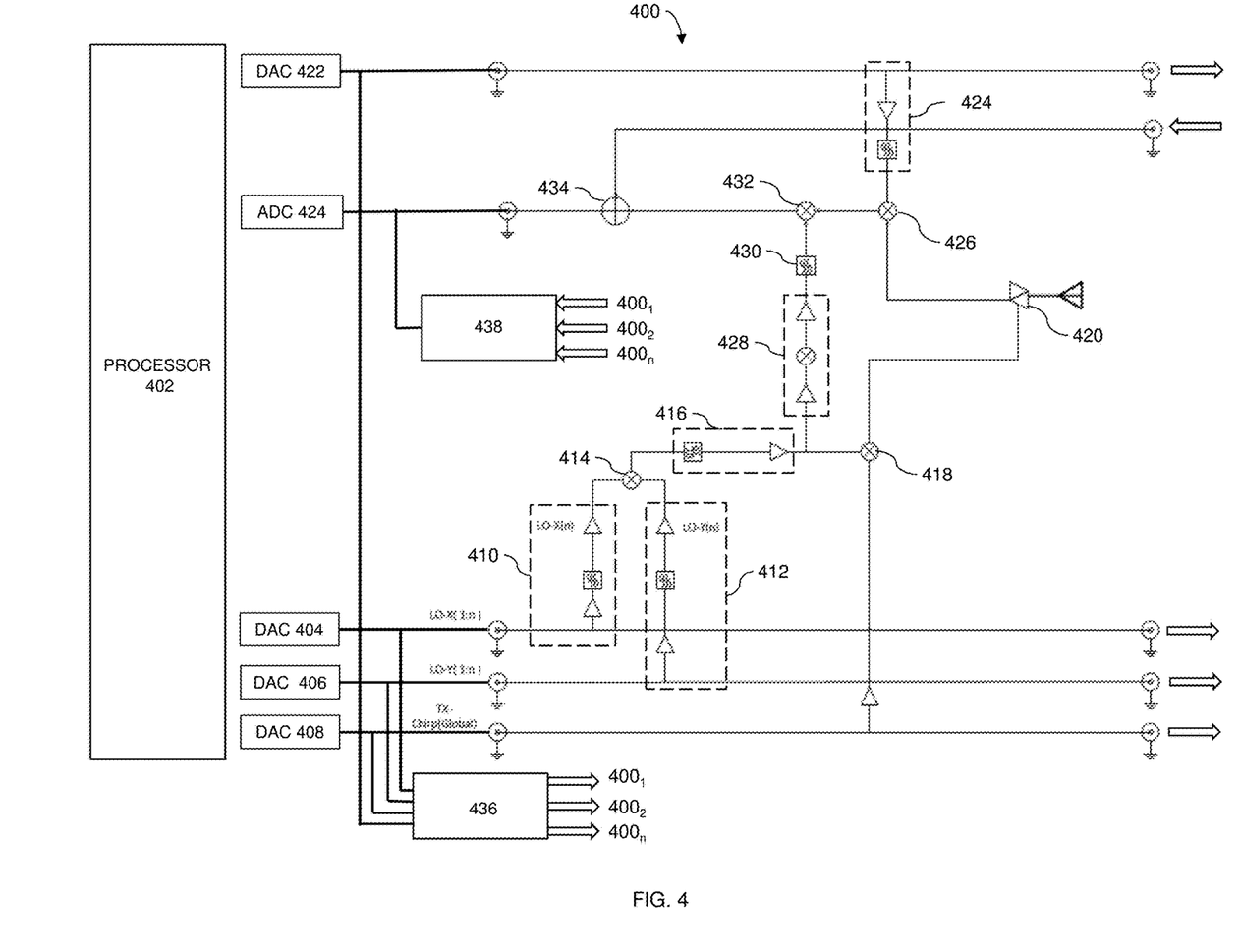
FIG. 4 illustrates another exemplary implementation of a synthetic aperture radar system according to the disclosed embodiments.

FIG. 4 shows another exemplary embodiment of an electronic element 400 that may be used as part of an implementation of a synthetic aperture radar system. While a single electronic element 400 is shown and described, it should be understood that the disclosed embodiments may utilize any number of electronic elements and typical embodiments may include a number of electronic elements chained together.

The electronic element 400 may include a processor 402, a DAC 404 for generating a local oscillator frequency signal LO-X(1:n), a DAC 406 for generating a local oscillator frequency signal LO-Y(1:n), and a DAC 408 for generating a transmitter chirp frequency signal TX-chirp. The electronic element 400 may also include a LO-X(n) signal amplifier and filter section 410 and a LO-Y(n) signal amplifier and filter section 412, both of which may be coupled to an LO generating mixer 414 with an output which may be coupled to an LO center frequency filter and amplifier section 416. The LO center frequency filter and amplifier section 416 may include a surface wave acoustical filter. An output of the LO center frequency filter and amplifier section 416 and the output of the DAC 408 for generating a transmitter chirp frequency signal TX-chirp may both be coupled to a transmit steering mixer 418, and the output of the transmit steering mixer may be coupled to a transceiver 420 for transmission by an element of a multi-element antenna.

The electronic element 400 may further include a DAC 422 for generating a global de-chirping signal, a de-chirping signal amplifier and filter section 424, a de-chirping mixer 426, an LO center frequency doubler 428 and filter 430, and a receive steering mixer 432. An output of the receive steering mixer 432 is coupled to a receive combiner 434, which in turn has an output coupled to an ADC 424 for converting received signals to digital signals to be provided to the processor 402.

In operation, the processor 402 may feed signals to DAC 404 for generating a local oscillator frequency signal LO-X(1:n). The LO-X(n) signal amplifier and filter section 410 may operate to amplify the LO-X(1:n) signal and filter the LO-X(1:n) signal to attenuate harmonics and limit the LO-X(1:n) signal to a specific frequency signal LO-X(n) which may be used to provide a weighted phase and amplitude. The output of the LO-X(n) signal amplifier and filter section 410 may be coupled to the LO generating mixer 414. The processor 402 may also feed signals to DAC 406 for generating a local oscillator frequency signal LO-Y(1:n). The LO-Y(n) signal amplifier and filter section 412 may operate to amplify the LO-Y(1:n) signal and filter the LO-Y(1:n) signal to attenuate harmonics and limit the LO-Y(1:n) signal to a specific frequency signal LO-Y(n). The output of the LO-Y(n) signal amplifier and filter section 412 may also be coupled to the LO generating mixer 414.

The processor 402 may operate to feed signals to the DAC 404 and the DAC 406 such that the specific frequency signals LO-X(n) and LO-Y(n), when combined by the LO generating mixer 414, produce the center frequency with a weighted phase and amplitude for steering a beam produced by the transceiver 420. For example, for an LO generating mixer output frequency of 400 MHz, the processor 402 may operate to feed signals to the DAC 404 and the DAC 406 such that each electronic element produces exemplary LO-X(n) and LO-Y(n) signals that when mixed, result in a 400 MHz signal with a specific phase and amplitude. As a further example with 5 electronic elements, the processor 402 may operate to feed signals to the DAC 404 and the DAC 406 such that each electronic element produces exemplary LO-X(n) and LO-Y(n) signals of 50 MHz and 250 MHz, 100 MHz and 200 MHz, 150 MHZ and 150 MHz, 200 MHz and 150 MHz, and 250 MHz and 50 MHz, respectively, with each combination providing different transmission phase angles and amplitudes.

The output of the LO generating mixer 414 may be coupled to the LO center frequency filter and amplifier section 416 which may operate to remove harmonics and other frequencies outside the center frequency bandwidth. The output of the LO center frequency filter and amplifier section 416 may be coupled to an input of the transmit steering mixer 418. The processor 402 may also feed signals to the DAC 408 in order to generate a transmitter chirp frequency signal TX-chirp for pulse compression which may also be coupled to an input of the transmit steering mixer 418. The output of the transmit steering mixer 418 may then be provided to the transceiver 420 for transmission.

The transceiver 420 may also operate to receive the backscattered transmitted signal which may then be de-chirped by the de-chirping mixer 426. The processor 402 may provide digital signals to the DAC 422 to generate the global de-chirping signal, which may be amplified and filtered by the de-chirping signal amplifier and filter section 424, and may then be mixed with the received backscattered signal by the de-chirping mixer 426 to de-chirp the received signal. The de-chirped received signal may then be provided to the receive steering mixer 432.

An output of the LO center frequency filter and amplifier section 416 may be doubled by the LO center frequency doubler 428, filtered by the LO center frequency filter 430, and may then be provided as another input to the receive steering mixer 432. The receive steering mixer 426 may operate to mix the de-chirped received backscattered signal and the doubled LO center frequency to produce an IF received signal, which may be combined with IF received signals from other electronic elements, if present, by the receive combiner 434. The combined received signals may be converted to a digital signal by the ADC 424 and provided to the processor 402.

While some embodiments may utilize a daisy chain of electronic elements 400, it should be understood that in alternate embodiments, the electronic elements 400 may be connected in parallel to DACs 404, 406, 408, and 422 and ADC 424 using power splitters 436, 438 that may provide individual signal paths between the DACs 404, 406, 408, and 422 and ADC 424 and each of the electronic elements $400_1 \ldots 400_n$.

Figure 5:
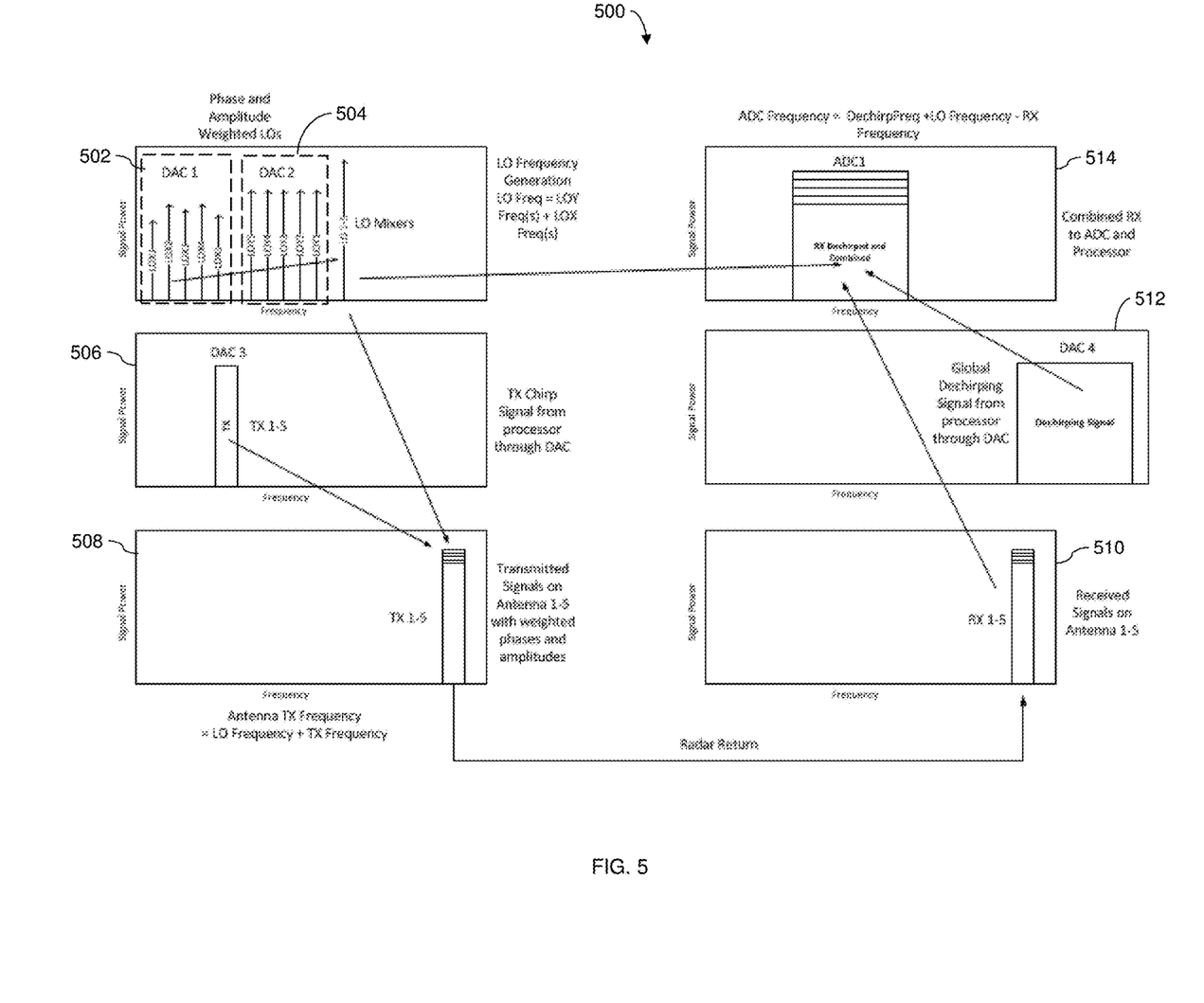
FIG. 5 illustrates an exemplary frequency plan for the embodiment of FIG. 4.

An exemplary simplified frequency plan 500 for an exemplary implementation of the embodiment of FIG. 4, utilizing 5 channels, is illustrated in FIG. 5. The local oscillator signals LO-X from DAC 404, having weighted phases and amplitudes, shown in block 502, may be mixed with the LO-Y signals from DAC 406, shown in block 504, and may then be further mixed with the TX-chirp signal from DAC 408, shown in block 506. The combination of the LO-X, LO-Y, and TX-chirp signals may be transmitted by the respective transceivers 420, as shown in block 508. As shown in block 510, the backscattered signals may be received, and as shown in block 512, the processor 402 may provide digital signals to the DAC 422 to generate the global de-chirping signal. As shown in block 514, the received signal may be de-chirped and then combined with a version of the local oscillator signals to produce the IF receive signal, which may be converted to a digital signal by the ADC 424 and provided to the processor 402.

While there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit and scope of the invention. Moreover, it is expressly intended that all combinations of those elements, which perform substantially the same function in substantially the same way to achieve the same result, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A frequency division multiplexing system comprising:
    a processor
    a first digital to analog converter (DAC) for generating a local oscillator signal;
    a second DAC for generating a chirp signal; and
    a plurality of electronic elements, each comprising:
        a transmit signal mixer for combining the local oscillator and chirp signals; and
        a transceiver configured to transmit the combined local oscillator and chirp signals;
    wherein the processor is configured to operate the first DAC and second DAC to vary frequencies of the local oscillator and chirp signals such that the combination of the local oscillator and chirp signals results in a constant center frequency with a varying phase.

2. The frequency division multiplexing system of claim 1, wherein the processor is configured to operate the second DAC to provide a signal for chirping the combination of the local oscillator and chirp signals.

3. The frequency division multiplexing system of claim 1, wherein the transceiver is configured to receive the combined local oscillator and chirp signals after transmission and backscattering, each electronic element further comprising:
    a receive signal mixer configured to down convert the received combined local oscillator and chirp signals using the local oscillator signal; and
    an analog to digital converter (ADC) for generating a digital representation of the down converted signal for analysis by the processor.

4. The frequency division multiplexing system of claim 3, further comprising a power splitter configured to connect the plurality of electronic elements to the first DAC, the second DAC, and the ADC in parallel.

5. The frequency division multiplexing system of claim 1, wherein the plurality of electronic elements are connected in a daisy chain.

6. A method of frequency division multiplexing comprising:
   using a processor and a first digital to analog converter (DAC) to generate a local oscillator signal;
   using the processor and a second DAC to generate a chirp signal;
   using a plurality of electronic elements to:
      combine the local oscillator and chirp signals; and
      transmit the combined local oscillator and chirp signals; and
   using the processor to operate the first DAC and second DAC to vary frequencies of the local oscillator and chirp signals such that the combination of the local oscillator and chirp signals results in a constant center frequency with a varying phase.

7. The method of frequency division multiplexing of claim 6, comprising using the processor to operate the second DAC to provide a signal for chirping the combination of the local oscillator and chirp signals.

8. The method of frequency division multiplexing of claim 6, comprising receiving the combined local oscillator and chirp signals after transmission and backscattering, and using each electronic element to:
   down convert the received combined local oscillator and chirp signals using the local oscillator signal; and
   generate a digital representation of the down converted signal for analysis by the processor.

9. The method of frequency division multiplexing of claim 6, comprising connecting the plurality of electronic elements in parallel through a power splitter.

10. The method of frequency division multiplexing of claim 6, comprising connecting the plurality of electronic elements in a daisy chain.

11. A frequency division multiplexing system comprising:
    a processor
    a first digital to analog converter (DAC) for generating a first local oscillator signal;
    a second DAC for generating a second local oscillator signal; and
    a plurality of electronic elements, each comprising:
       a local oscillator generating mixer for combining the first and second local oscillator signals, wherein the processor is configured to operate the first DAC and second DAC to vary frequencies of the first and second local oscillator signals such that the combination of the first and second local oscillator signals results in a constant center frequency with a varying phase;
       a third DAC for generating a chirp signal to be combined with the combination of the first and second local oscillator signals for pulse compression; and
       a transceiver configured to transmit the combined local oscillator and chirp signals.

12. The frequency division multiplexing system of claim 11, wherein the transceiver is configured to receive the combined local oscillator and chirp signals after transmission and backscattering, each electronic element further comprising:
    a de-chirping mixer configured to de-chirp the received combined local oscillator and chirp signals using a global de-chirping signal;
    a receive signal mixer configured to down convert the de-chirped combined local oscillator signals using the combined local oscillator signal; and
    an analog to digital converter (ADC) for generating a digital representation of the down converted signal for analysis by the processor.

13. The frequency division multiplexing system of claim 11, further comprising a power splitter configured to connect the plurality of electronic elements to the first DAC, the second DAC, the third DAC, and the ADC in parallel.

14. The frequency division multiplexing system of claim 11, wherein the plurality of electronic elements are connected in a daisy chain.

15. A method of frequency division multiplexing comprising:
    using a processor and a first digital to analog converter (DAC) for generating a first local oscillator signal;
    using the processor and a second DAC for generating a second local oscillator signal; and
    using a plurality of electronic elements to:
       combine the first and second local oscillator signals;
       use the processor to operate the first DAC and second DAC to vary frequencies of the first and second local oscillator signals such that the combination of the first and second local oscillator signals results in a constant center frequency with a varying phase;
       use the processor to operate a third DAC to generate a chirp signal to be combined with the combination of the first and second local oscillator signals for pulse compression and transmission.

16. The method of frequency division multiplexing of claim 15, comprising receiving the combined local oscillator and chirp signals after transmission and backscattering, and using each electronic element to:
    de-chirp the received combined local oscillator and chirp signals using a global de-chirping signal;
    down convert the de-chirped combined local oscillator signals using the combined local oscillator signal; and
    generate a digital representation of the down converted signal for analysis by the processor.

17. The method of frequency division multiplexing of claim 15, comprising connecting the plurality of electronic elements in parallel through a power splitter.

18. The method of frequency division multiplexing of claim 15, comprising connecting the plurality of electronic elements in a daisy chain.

\* \* \* \* \*